Patented Nov. 14, 1939

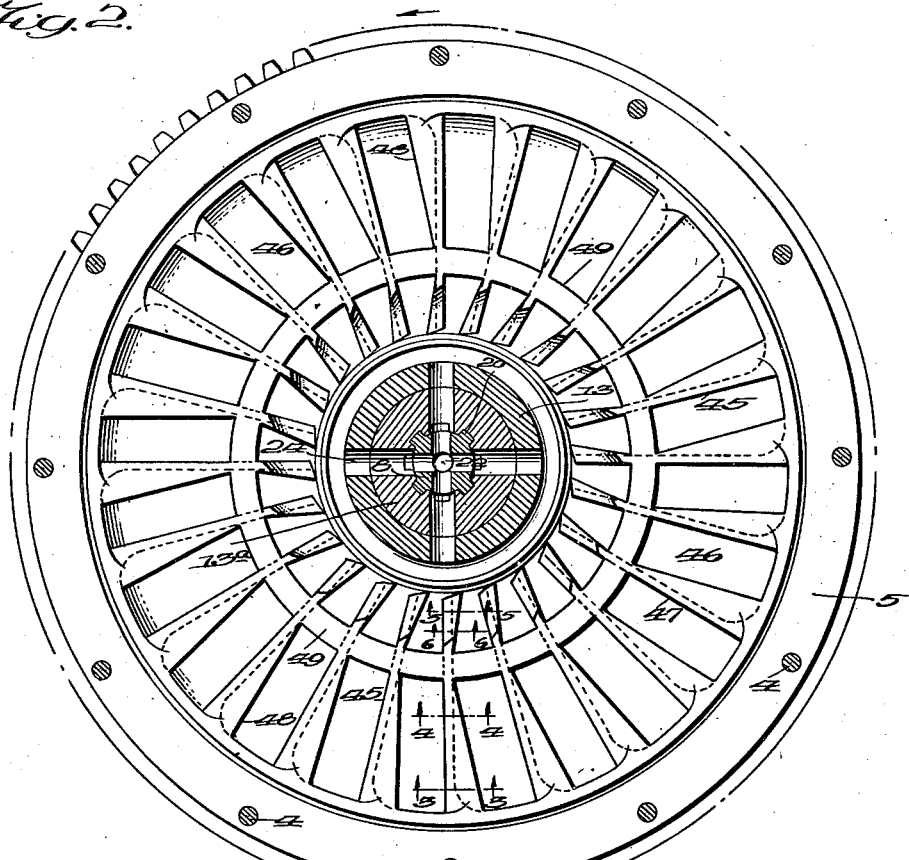

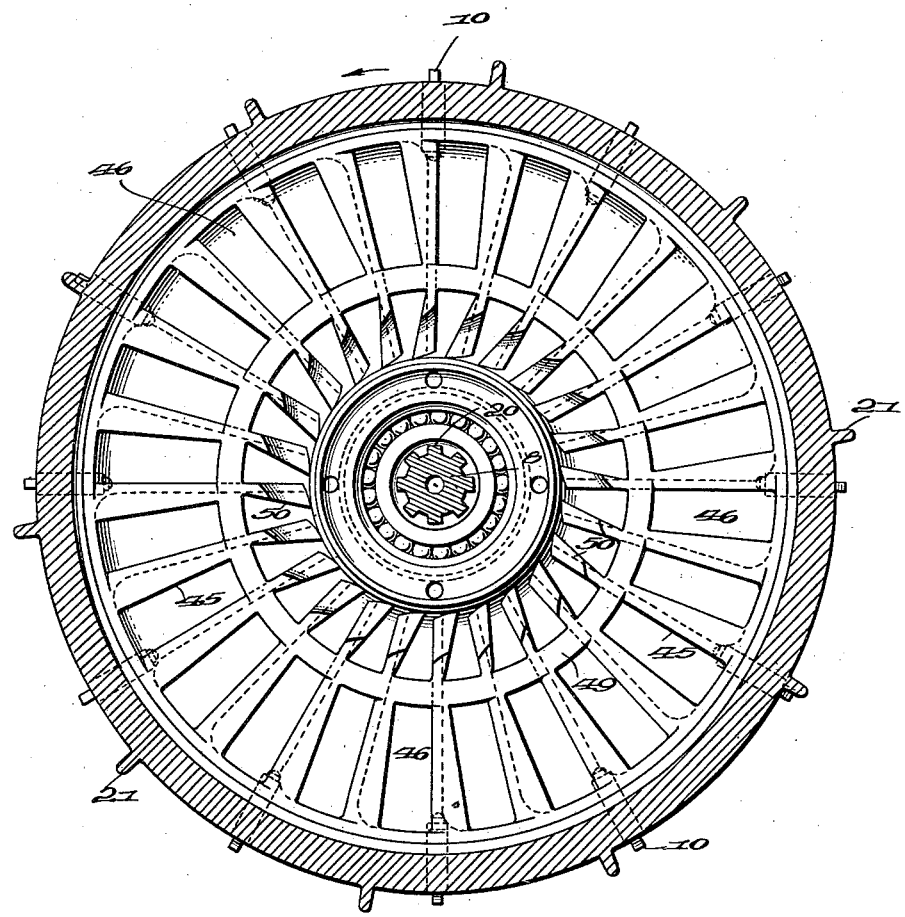
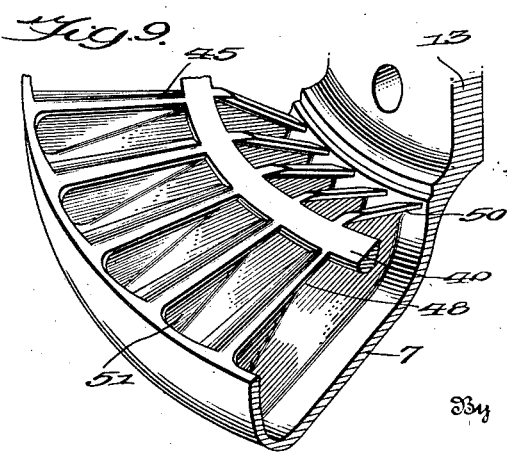
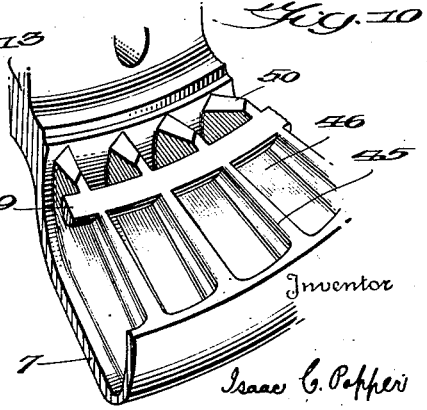

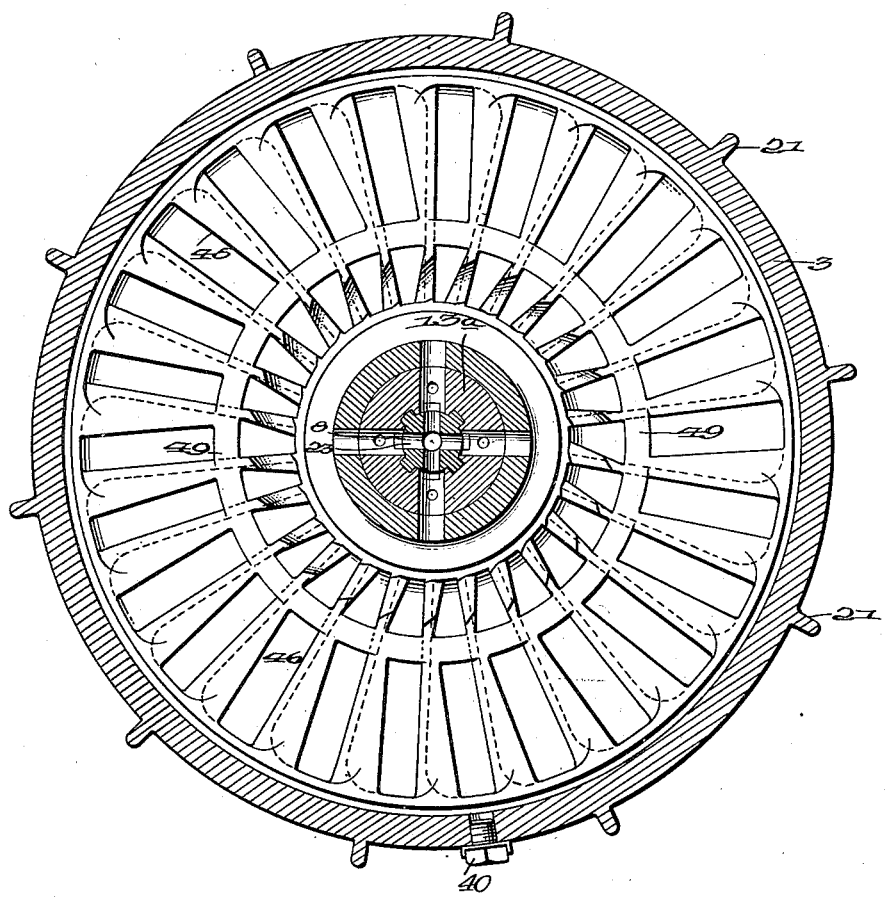
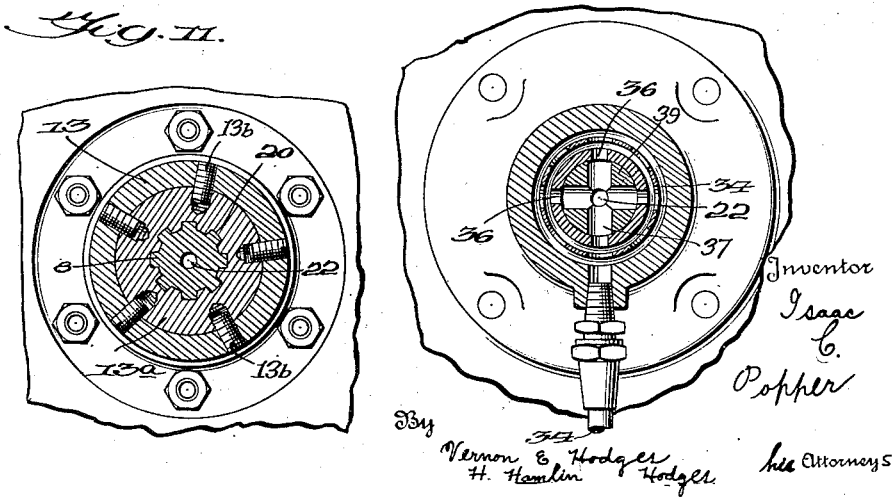

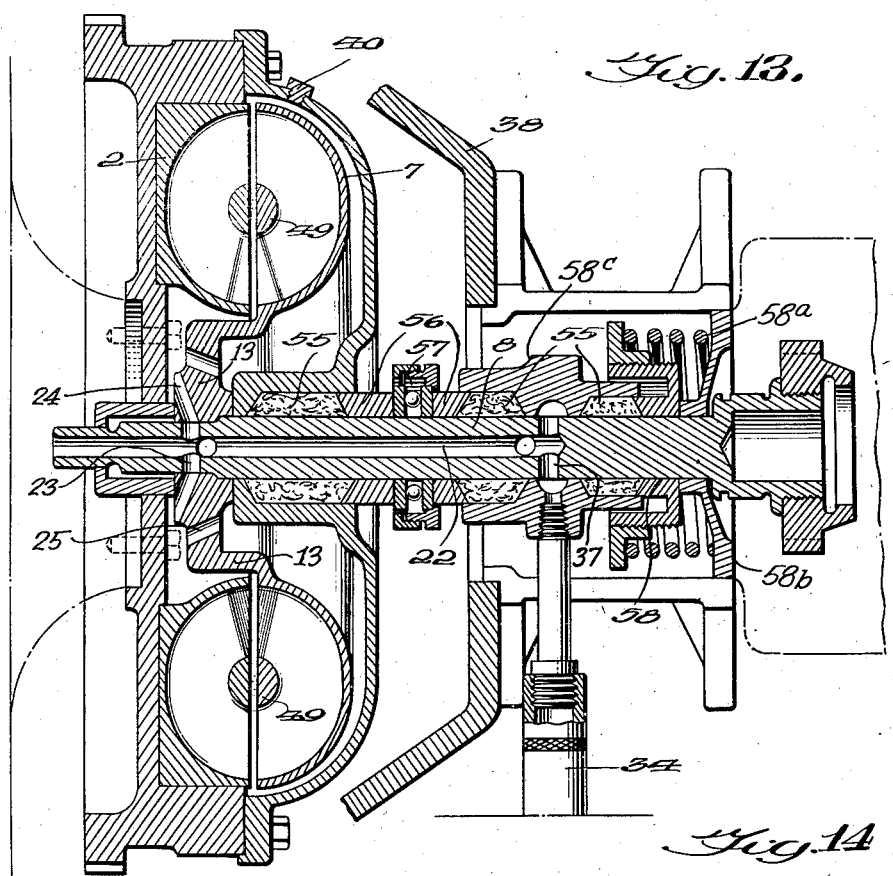
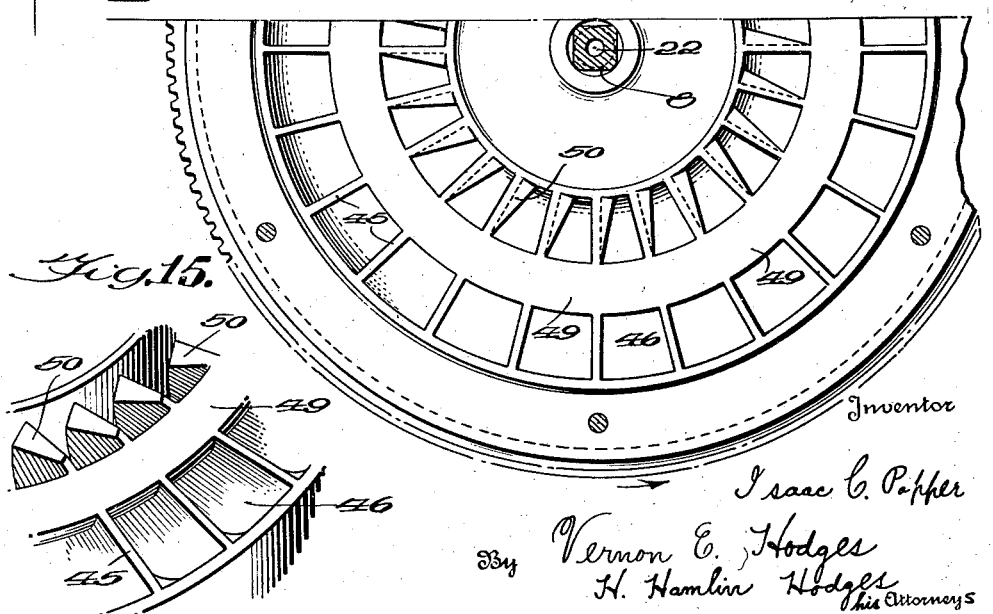

2,179,520

UNITED STATES PATENT OFFICE 2,179,520

AUTOMATIC TURBINE DRIVE

Isaac C. Popper, New York, N. Y., assignor to Automatic Turbine Drive Company, Inc., Providence, R. I., a corporation of New York Application February 2, 1937, Serial No. 123,704

8 Claims. (Cl. 60—54)

My invention relates to an improvement in automatic turbine drives.

This application is a continuation in part of an application made by me on February 28, 1934, Serial No. 713,388, for Letters Patent on an improvement in Hydraulic turbine clutches and transmissions, and an improvement on invention disclosed in application Serial No. 751,668, filed November 5, 1934, and the fundamental object of this invention is to provide a simplified means of operation and control of motor-propelled vehicles. The invention does away with the ordinary time-honored clutch mechanism with the repeated shifting incident to its use. Consequently, the major part of the driving including starting and stopping, may be confined exclusively to the use of the usual foot-pedals, leaving the hands of the driver free to steer the car, except when it is necessary to shift gears on very steep grades and for very hard pulling.

A further object of my invention is to provide a hydraulic transmission which does not require the use of external cooling means, since when it does heat with continued operation of the car, the heat decreases and never becomes objectionable and in fact varies almost constantly.

Another object of my invention is to provide a hydraulic transmission arrangement which will automatically control the slippage between the rotors so as to provide ample starting torque followed by change of slippage to adjust the torque to the operating requirements.

Another object of my invention is to provide a vane construction for the rotors of a fluid transmission which can be readily fashioned to control the slippage of the operating fluid between the rotors.

An additional object of my invention is to provide an improved construction for a hydraulic transmission which automatically compensates for excessive starting pressure.

Still another object of this invention is to provide an improved construction for a hydraulic transmission which minimizes friction of the operating parts and reduces wear thereof.

The invention comprises one or more pairs of rotors, each pair including a driving and driven rotor, each pair having a flow of fluid occupying the space or spaces between driving and driven rotors, and between them and an outer casing, respectively, the supply of fluid being maintained from and by some suitable source of pressure.

The present invention further comprises at least two pairs of rotors, each pair including a driving and driven rotor forming a fluid chamber therebetween, a casing forming fluid chambers which communicate with the other fluid chambers, and a driven shaft concentric with the rotors, and means of fluid communication between the fluid chambers of the two pairs of rotors.

The present invention further comprises at least two pairs of rotors, each pair including a driving and driven rotor forming a fluid chamber therebetween, a casing forming fluid chambers which communicate with the other fluid chambers, and a driven shaft concentric with the rotors, at least one of the driven rotors being movable lengthwise of the driven shaft.

The invention further comprises a combination of driven shaft, driving and driven rotors in pairs, the pairs of rotors mounted in tandem arrangement concentric with the driven shaft, a casing enclosing the rotors, one rotor of each pair rotatable with the driven shaft and slidable thereon, each pair of rotors and the casing forming communicating fluid chambers, and a source of fluid supply for all of said chambers.

As a further feature, this invention includes a combination of a casing forming a fluid housing, a driven shaft, driving and driven rotors within the casing, said rotors having vanes for circulating fluid in a spiral path between the rotors, said vanes being shaped to constrict the flow area at the adjacent rotary surfaces as the vanes approach the hubs of the rotors.

Other features not hereinbefore alluded to are included in the invention, and will be hereinafter specifically described and pointed out in the claims.

In the accompanying drawings:

Fig. 2 is a section on line 2—2 of Fig. 1, looking in the direction of the arrow;

Fig. 3 is an enlarged sectional view on the line 3—3 of Fig. 2 of one of the vanes looking in the direction of the arrow;

Fig. 4 is a similar section on the line 4—4 of Fig. 2, looking in the direction of the arrows;

Fig. 5 is a similar section on the line 5—5 of Fig. 2, looking in the direction of the arrow;

Fig. 6 is a similar view on the line 6—6 of Fig. 2, looking in the direction of the arrows;

Fig. 7 is a view looking into one of the driving rotors, showing twenty-four buckets;

Fig. 8 is a similar view looking into one of the driven rotors showing twenty-six buckets;

Figs. 9 and 10 are fragmentary perspective views taken from different positions and showing a form of vanes and shape of buckets therebetween;

Fig. 11 is a section on the line 11—11 of Fig. 1, looking in the direction of the arrow;

Fig. 12 is a section on the line 12—12 of Fig. 1, looking in the direction of the arrow;

Fig. 13 is a sectional view in which the driven rotor turns with the driven shaft, but is not movable thereon;

Fig. 14 is a view looking into the driving rotor shown in Fig. 13;

Fig. 15 is a fragmentary perspective of the form of rotor illustrated in Fig. 14;

Fig. 16 is a modification showing driving and driven rotors of different diameters.

Figure 1:
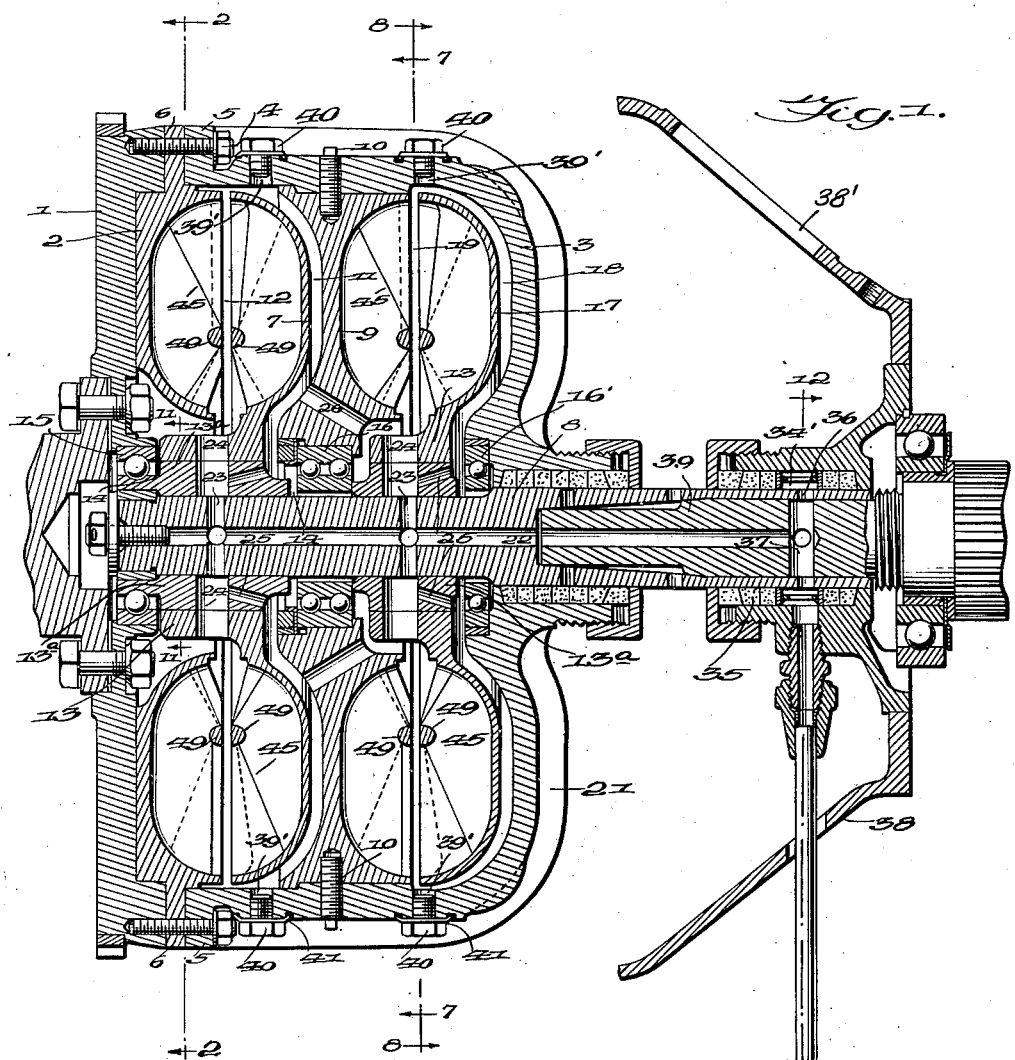
Fig. 1 is a sectional view of my improved automatic turbine drive showing two sets of tandem rotors enclosed in a single casing.

The numeral 1 represents the usual fly-wheel, and 2, is the left-hand driving rotor. The numeral 3 represents a casing which encloses the rotors, and according to the illustrations is held rigidly to the fly-wheel 1 by a row of screws 4 which extend through a flange 5 formed on the casing and the flange 6 formed exteriorly all the way around the left-hand driving rotor 2 and into the fly-wheel 1. The numeral 7 indicates the left-hand driven rotor.

When two or more sets of pairs of rotors are employed, they are arranged in tandem, as shown in Fig. 1, or in other words one in advance of the other, and all rotors are shown concentric with the driven shaft 8. In the construction illustrated, the right-hand driving rotor 9 is secured within the casing 3 by screws 10 extending therearound, and the back of the right-hand driving rotor 9 forms a fluid chamber 11 between it and the outer surface of the driven rotor 7 to accommodate the flow of fluid which escapes peripherally from the fluid chamber 12 formed by and between the two rotors 2 and 7. Cooperating vanes and intervening buckets are formed on the opposing sides of these two rotors, and as these are preferably of special construction they will be hereinafter specifically described.

Rotor 7 is provided with a hub 13, which latter is provided with a tubular lining 13a, the hub and lining being secured together by set-screws 13b and the rotor thus constructed is slidably keyed to the driven shaft 8 with which it turns, space 14 being left at one or both ends to permit the driven rotor 7 to slide or move endwise on the driven shaft 8. Thrust-bearings 15 and 16 are located on either side of the hub 13, and they not only prevent friction but they positively limit and define the movement of the driven rotor lengthwise of the driven shaft. The right-hand driven rotor is similarly provided with a thrust-bearing 16'. These thrust-bearings being located in the direct path of the hub of the driven rotors as they move along the shaft in response to the varying pressures of fluid on the two sides of the driven rotors constitute stops between which the movements of the driven rotors are confined. Consequently, they are the means of maintaining the required and uninterrupted fluid space around the driven rotor, which has been termed the fluid chamber 11 throughout the specification.

The right-hand driven rotor 17 is keyed to the driven shaft 8 and is slidably mounted thereon, and a fluid chamber 18 is formed between this rotor and the casing 3, which fluid chamber communicates with the fluid chamber 19 formed between the two rotors 9 and 17 just as previously described in connection with the fluid chambers 11 and 12 previously described.

The driven shaft 8 has a fluted formation 20 to provide for back and forth movement of the driven rotors 7 and 17 thereon. The movement of the driven rotors 7 and 17 back and forth on the driven shaft 8 is responsive to any inequality or change in fluid pressures on the opposite sides of the driven rotor. Ribs 21 on the casing 3 are provided mainly to add strength and sturdiness to the latter, and, incidentally, they increase the exposed area of the casing and have a cooling tendency.

The driven shaft 8 has a bore 22 through the axial center for the passage of operating fluid, and radial outlets 23 therefrom at intervals communicate with holes 24 through the hubs 13 of the driven rotor or rotors, and a duct or ducts 25 extend from the holes 24 to the fluid chambers 11 and 18, and in this way the bore 22 through the center of the driven shaft 8 is in direct communication with the several fluid chambers 11, 12, and 18 and 19, of the two sets of rotors, when two are employed. One or more communicating passages 26 through the driving rotor connect the sets of fluid chambers when more than one set of rotors is employed, as shown in Fig. 1.

The numeral 27 represents a pressure reservoir adapted to be filled with operating fluid. This reservoir has a piston 28 fitted therein, preferably with cup washers 29, and a piston-rod 30 extends from the piston through a packing-gland 31 in one end of the reservoir. Pressure is preferably exerted on one side of the piston through a stiff spring 32 which has a definite resistance. The tank 27 is filled through valve 33, and pipe 34 leads from this tank to the annular space 34' in the packing assembly 35 around the driven shaft 8, and there communicates through radial outlets 36 and 37 in the transmission shaft 39 with the bore 22 through the shaft. The spring 32 or other means of sufficient compressive force, as air for instance, is designed to force the operating fluid from the reservoir 27 to the fluid chambers and at the same time permit its return when the pressure created by the operation of the rotors exceeds the pressure back of the piston 28 in the reservoir.

An outer housing 38 encloses all of this mechanism as shown in Fig. 1. This housing 38 has at least one large opening 38' for the free circulation of air. The driven shaft 8 is connected with the transmission assembly 39 as viewed in Fig. 1.

The fluid chambers between and around the rotors are filled through holes 39' in the casing, and these are kept tightly closed by screws 40 and washers 41.

In supplying the operating fluid, the valve 33 in the reservoir 27 is opened, and the piston 28 is forced back against the spring 32, and the reservoir is partly filled, after which the valve 33 is closed. The fluid chambers 11, 12, 18 and 19 may also be filled through the holes 39 in the casing 3, after which they are closed tightly by the screws 40.

The vanes in the rotors and the buckets formed by them will now be described. While it is obvious that they are subject to considerable variation in shape, size and numbers, nevertheless, the various forms illustrated have been tried and have proven very satisfactory after a great deal of testing and experimentation. Those illustrated in Fig. 1 are shown more or less in detail in Figs. 2 to 10 inclusive, and will now be described. The vanes are represented by the numeral 45. These extend radially, and consequently form a plurality of tapering buckets 46 there between, which buckets in other words gradually decrease in area as they approach the axis of rotation. These vanes and buckets in the driving and driven rotors are counterparts of each other, and there may be an equal number on vanes and bucket, in the opposed rotors, or in some instances there may be a greater number of vanes and buckets in one rotor than in the other. For instance, in Fig. 7, which is a driving rotor, twenty-four (24) of these vanes are illustrated, whereas in Fig. 8, which shows a driven rotor, there are twenty-six (26) vanes and buckets.

Perhaps in Figs. 9 and 10, which are fragmentary perspective views, there will be found the best illustration of the preferred form of vanes and buckets. These vanes are straight or approximately straight on the back side 47. These vanes are also shown in the cross-sectional views taken on different lines in Figs. 3, 4, 5 and 6.

These vanes 45 are formed with an overhanging flange 48 at the outside edge, the maximum width of which is at their outer ends, as better shown in Figs. 2, 7 and 8, from which outer point they gradually decrease in width giving them a more at less wedge-shape, reaching their narrowest width at a point more or less two-thirds of their length, where the flat outer surfaced annular ring 49 connects them all together integrally at their outer surfaces. In this way, at their outer ends, a concavity 51 is formed in each bucket beneath each flange 48 where the concavity has its greatest depth and the bucket its greatest capacity, as clearly shown in Fig. 3. From the annular ring 49, the tops of the vanes gradually widen out toward the hub as viewed in Figs. 2, 5, 7, 8, 9 and 10 into a more or less wedge-shape, but in reverse of the wedge or tapering shape at the other ends of the vanes. These inner end flanges are designated by the numeral 50 and they overhang in the same direction as flanges 48, and these flanges 50 preferably have beveled upper surfaces as clearly illustrated in Figs. 5, 9 and 10.

Both flanges 48 and 50 cooperate to produce the required concavity at the backs of the buckets to give them the required capacity and to direct and create the proper discharge of the fluid from the buckets of one rotor to the buckets of the other, thus creating the required turbine effect upon the fluid which produces a vortex or spiral effect as the fluid issues across from rotor to rotor. The relative height of the vanes at the inner ends and the width of the overhanging bevel formation of the flanges 50 are important factors since it is at this inner and annular area in the neighborhood of the hub of the rotors that the major portion of the slippage between rotors occurs, and while it is seldom that gears have to be shifted, it has been found by actual tests that the facility of shifting is dependent to a large extent upon the width and shape of these overhanging flanges 50. If too wide, the shifting is hard. By controlling the width and edge of the flanges, the proper slippage is insured and the resultant shifting is made easy.

It has been found by actual tests that the shape and width of these flanges has a salutary influence on the shifting of gears, due to their control of the slippage, rendering the shift difficult when too wide, which condition becomes remedied by reducing the width and making the free edges of the flanges more rounding and less sharp.

In the construction shown in Fig. 13, the driven rotor is mounted on the end of, and is keyed to driven shaft 8, but does not move endwise on it. In this figure there are shown three packings 55, two packing-rings 56, a thrust bearing 57 between the rings 56, a gland 58c between two of the packings 55 and having an internal channel by which the pipe 34 from the tank 27 communicates with the bore 22 of the shaft 8, a follower 58 bearing against one of the packings 55, a spring 58a being interposed between the follower 58, and a fixed head 58b.

In Figs. 14 and 15, the outer ends of the vanes 45 are shown without flanges, and the inner ends are provided with lateral flanges 50.

Fig. 16 illustrates a modified construction in which one of the driven rotors is of less diameter than the adjacent driving rotor and this construction is designed to cause the flow of fluid at the periphery of right-hand driving and driven rotors to discharge with violent force straight over and across the outer edge of the driven rotor 17a and thence into the fluid chamber 18 back of it, whereby an excessive pressure is created between the outer surface of the driven rotor 17a and the inner wall of the casing 3. In this exemplification of my invention, the driven rotor has a greater number of buckets, preferably twenty-seven, as compared with twenty-six buckets in the driving rotor. The reason for this change is that the fluid which is thrown from the right-hand driving rotor to the right-hand driven rotor by passing over and across the edge of the driven rotor, strikes the inner wall of the casing with such tremendous force as to create greatly increased pressure in the fluid chamber 18 between it and the driven rotor, thereby forcing the driven rotor to its forward position quicker by the almost instantaneous reduction of the space and size of the fluid chamber between rotors. The quicker this space is reduced in size, the quicker the power is transmitted to the driven shaft. This construction, like the others, has been thoroughly tested and found to operate very satisfactorily. This particular construction does not differ essentially in principle of operation from what has been previously described.

The theory of operation as carried out through all forms is based on the turbine principle. Upon the initial rotation of the fly-wheel, the driving rotor or rotors immediately set the fluid in the fluid chamber or chambers in motion. With increased acceleration, a violent churning of the fluid in the fluid chambers between rotors takes place and it is circulated and re-circulated across from buckets to buckets, in a spiral flow. This constitutes what is termed the primary flow of the fluid and the centrifugal action causes fluid movement from between the driven rotors and the casing, around the periphery of the rotors with increasing pressure, whereby the driven rotors are moved toward the driving rotors on the driven shaft in response to said increasing pressure, and when with increased acceleration their speed becomes approximately the same, they travel substantially together, and, consequently, with a minimum of friction as the rotors are then virtually held together as a unit, all of which is reflected in variaitons in fluid temperatures. The driven rotor or rotors are at all times free to respond to any excess of pressure, whether it be on one side or the other of the driven rotor or rotors. It will be observed that all clutching action and transmission of power from one rotor to the other is due to the fluid medium and nothing else.

In other words, the mechanical contact between rotors is in the region of the driven shaft, and, to be more specific, at the hub of the driven rotor or rotors, and the transmission and control of motion from one rotor to the other, is through the medium of the fluid.

The circulating fluid medium is always under the influence of a degree of pressure which automatically responds to the requirements of the rotors.

The arrangement and shape of the vanes and opposing cooperating intervening buckets in the rotors is an important contributory factor to the efficiency of operation, and the peculiar circulatory action of the fluid in and out of opposing buckets in its primary flow between the opposing rotors and the freedom of movement of the fluid in the circuit described and the self-regulating and responsive pressure due to the reserve supply of fluid in the pressure reservoir and circuitous passage of the fluid back and forth, continuously, and in contact with the wall of the casing, and the return through the passageways to the pressure tank, are all contributory in preventing excessive heating of the fluid.

The freedom of movement of the driven rotor, slidable as it is on the driven shaft, acts as a species of control for regulating the speed and volume of fluid circulation in the fluid chambers and thus functions to assist the speed of fluid circulation. Thus this invention includes a self-contained recirculatory system which is entirely confined within the casing.

In addition to the suggested modifications and changes herein described, it is obvious that others might be made in the form and arrangement of the various parts of this invention.

A general description of the operation of the invention follows:

My improved hydraulic transmission thus comprises a driving and driven rotor, housed within a casing, the driven rotor being rotatable with and slidably mounted on the driven shaft so as to be movable in response to variations of fluid pressure, and the casing being directly connected preferably through a bore formed in the driven shaft, with operating fluid maintained under pressure in a fluid reservoir, whereby the fluctuations of pressure within the casing are compensated for by interchange of fluid with the reservoir. Actual tests of my improved hydraulic transmission disclose that there is a continual interchange of fluid between the casing and the reservoir in accordance with changes in operating conditions. When the motor is started, the fly-wheel, to which the driving rotor is secured, revolves at an idling speed, the speed depending on the particular engine. The casing is full of fluid at the time of starting. As the driving rotor rotates, the fluid is agitated, and this agitation creates a pressure which forces the driven rotor away from the driving rotor and toward the casing, the driven rotor moving outwardly until it reaches the outer limit stop. As the speed of the driving rotor increases, the driven rotor begins to revolve and to turn the driven shaft. If the pulling load of the car is heavy the agitation is greater, and the driven rotor is slower to revolve, the greater agitation and the greater slippage due to the load producing more or less heating of the fluid. As the driven rotor picks up speed, the agitation decreases and a smooth circulation of fluid takes place between the driving and driven rotor, the slippage decreasing with a resultant reduction in friction. The driven rotor then moves inward towards the driving rotor, and a condition is finally reached where both the driven rotor and the driving rotor revolve substantially as a unit, with very little slippage and resultant friction. Under these operating conditions, there is a minimum of heating, and this small amount of heating is readily taken care of by the circulation of the fluid throughout the inside and outside fluid chambers, so that my improved hydraulic transmission actually runs under operating conditions with a relatively cool fluid.

During the starting operation, the fluid agitation and the resulting pressure forces some of the fluid back to the reservoir, the fluid chamber around the driven rotor and the openings through the hub of the rotor facilitating the fluid movement. When the agitation decreases and the circulation between the rotors begins to be a smooth circulation with substantially no friction, due to the synchronized movement of the driving and driven rotors, the fluid in the reservoir is forced back through the driven shaft into and between the rotors on account of the pressure in the reservoir. There is thus a constant back and forth movement of the fluid, responding to changes in road conditions and the changing pull of the car, this being largely dependent on the grade of the road. The automatic movement of the driven rotor thus becomes a movement which corresponds to the amount of gas fed to the engine, and to the road conditions, and the changing road conditions are therefore compensated for by control of the throttle.

The amount of slippage between the driving and driven rotors may be regulated by varying the width and/or the shape of the flanges of the vanes, thereby increasing or decreasing the transmission of power from one rotor to the other rotor. Also the slippage may be increased by rounding off the forward edges of the flanges. My preferred means of controlling the slippage is to vary the width of the flanges at the inflow openings of the buckets, of opposed rotors thus varying the flow area; but the same control may also be provided at the discharge openings, depending on the size and design of the rotors.

I claim:

1. The combination of a driven shaft, two sets of driving and driven rotors concentric therewith and arranged in tandem, said rotors provided fluid chambers therebetween, a separate casing means enclosing each set of rotors, each casing means arranged to provide a fluid chamber between it and one rotor of each set of rotors, and means of communication between said fluid chambers.

2. The combination of a driven shaft, at least two pairs of driving and driven rotors concentric therewith and arranged in tandem, and providing fluid chambers between each pair of rotors, means enclosing the rotors and providing communicating fluid chambers between said means and one rotor of each pair of rotors, and means of communication from the fluid chamber between one pair of rotors and the fluid chamber outside of the other pair of rotors.

3. The combination of a driven shaft, at least two sets of driving and driven rotors concentric therewith and arranged in tandem, and providing fluid chambers between each set of rotors and a casing which encloses the rotors and provides communicating fluid chambers between said casing and one rotor of each pair of rotors, at least one of the rotors being freely slidable with respect to the driven shaft.

4. The combination of a driven shaft, at least two sets of driving and driven rotors concentric therewith and arranged in tandem, and providing fluid chambers between the each pair of rotors and a casing which encloses the rotors and provides communicating fluid chambers between the casing and one rotor of each pair of rotors, one rotor of each pair of rotors being freely slidable lengthwise of the driven shaft.

5. The combination of a driven shaft, at least two pairs of driving and driven rotors arranged in tandem and mounted concentric therewith, each pair of rotors forming a fluid chamber therebetween, means enclosing said rotors and forming separate fluid chambers outside of said pairs of rotors, each of which fluid chambers communicates with the fluid chamber of the adjacent pair of rotors, the driven shaft having a bore formed lengthwise therethrough and having outlets leading therefrom, the hubs of one rotor of each pair of rotors having holes which communicate with the outlets from the bore in the driven shaft, ducts leading from the holes in the hubs to the fluid chambers outside of the rotors, means of communication between the fluid chamber outside of one pair of rotors and the fluid chamber formed between the other pair of rotors and a source of fluid supply communicating with the bore of the driven shaft.

6. The combination of a driven shaft, at least two pairs of driving and driven rotors arranged in tandem and mounted concentric therewith, each pairs of rotors forming a fluid chamber therebetween, one rotor of each pair of rotors being movable lengthwise of the driven shaft, means enclosing said rotors and forming fluid chambers outside of said pairs of rotors, each of which fluid chambers communicates with the fluid chamber of the adjacent pair of rotors, the driven shaft having a bore formed lengthwise therethrough and having outlets leading therefrom, the hubs of one rotor of each pair of rotors having holes which communicate with the outlets from the bore in the driven shaft, ducts leading from the holes in the hubs to the fluid chambers outside of the rotors, means of communication between the fluid chamber outside of one pair of rotors and the fluid chamber formed between the other pair of rotors and a source of fluid supply communicating with the bore of the driven shaft.

7. The combination of a driven shaft, a driving and driven rotor set concentric therewith, and forming a fluid chamber therebetween, said rotors each having fluid buckets and being of different diameters, whereby the fluid buckets of one rotor extend beyond the rim of the other rotor, and a casing forming a second fluid chamber exteriorly of said other rotor, said second fluid chamber communicating with the first fluid chamber near the axis thereof, whereby the fluid issuing from between the rotors at the periphery thereof flows from said one rotor directly over and across the rim of the other rotor and into said second fluid chamber.

8. A rotor including a hub and radial vanes, which vanes form buckets therebetween, each vane extending laterally to provide two tapering flanges at the outer edge thereof, which flanges gradually increase in width from a point intermediate the hub and the periphery of the rotor, the flanges adjacent to the hub gradually thinning toward the outer edge and being formed to facilitate reduction in width to afford the proper degree of slippage.

ISAAC C. POPPER.